United States Patent [19]

Ford, Jr. et al.

[11] Patent Number: 4,473,537
[45] Date of Patent: Sep. 25, 1984

[54] AMMONIA CONTROL SYSTEM FOR $NO_x$ EMISSION CONTROL FOR GAS TURBINE EXHAUST

[75] Inventors: Mark R. Ford, Jr., West Roxbury; Brian G. Colozzi, Winthrop, both of Mass.

[73] Assignee: General Electric Company, Lynn, Mass.

[21] Appl. No.: 453,320

[22] Filed: Dec. 27, 1982

[51] Int. Cl.$^3$ .......................... B01J 8/00; C01B 21/00
[52] U.S. Cl. ................................. 423/239; 423/235; 422/62; 422/111; 436/116; 436/117; 436/118; 364/500
[58] Field of Search ........................ 436/116, 117, 118; 422/111, 62; 364/500; 423/235, 23 D, 239, 239 A

[56] References Cited

U.S. PATENT DOCUMENTS

| | | | |
|---|---|---|---|
| 3,977,836 | 8/1976 | Matsuda et al. | 23/232 |
| 4,188,190 | 2/1980 | Murati et al. | 422/111 X |
| 4,213,944 | 7/1980 | Azuhata et al. | 423/235 |
| 4,293,521 | 10/1981 | Isahaya et al. | 422/62 |
| 4,302,205 | 11/1981 | Murati et al. | 423/235 X |
| 4,314,345 | 2/1982 | Shiraishi et al. | 423/235 X |
| 4,324,759 | 4/1982 | Aoki et al. | 422/111 X |

FOREIGN PATENT DOCUMENTS

| | | | |
|---|---|---|---|
| 51-40371 | 4/1976 | Japan | 423/235 |
| 56-33025 | 4/1981 | Japan | 423/235 |
| 56-163742 | 12/1981 | Japan | 422/11 |
| 57-2425 | 1/1982 | Japan . | |
| 57-159527 | 1/1982 | Japan | 422/111 |

Primary Examiner—Gregory A. Heller
Attorney, Agent, or Firm—James W. Mitchell

[57] ABSTRACT

A steam and gas turbine combined cycle plant STAG* employs a catalyst in a heat recovery steam generator to react injected ammonia with $NO_x$ from the combustor of the gas turbine to reduce atmospheric emission of $NO_x$ from the system. Rapid control of ammonia injection is achieved using a prediction of the $NO_x$ being generated in dependence upon the operating conditions of the combustor. A trimming signal from a measurement of $NO_x$ being emitted from the heat recovery steam generator downstream of the catalyst is employed to complete the $NO_x$ control loop. Compensation is provided to relate the measured $NO_x$ downstream of the catalyst with the $NO_x$ in the output of the gas turbine taking into account the catalyst efficiency.

6 Claims, 8 Drawing Figures

AMMONIA CONTROL SYSTEM FOR $NO_x$ EMISSION CONTROL FOR GAS TURBINE EXHAUST

BACKGROUND OF THE INVENTION

The present invention relates to pollution control and, more particularly, to catalytic reduction of nitrogen oxide pollutants in a gas turbine exhaust.

Most internal combustion engines employing hydrocarbon fuels produce power by burning the fuel by reaction with oxygen in the air. As is well known, however, oxygen comprises only about 21 percent by volume of the air. The majority of the remaining 79 percent is nitrogen which does not contribute to the combustion reaction. However, under the conditions in the combustion chamber of an internal combustion engine, the nitrogen tends to react chemically with excess oxygen to produce compounds which are unwelcome pollutants in the exhaust. Such compounds may be $NO$, $NO_2$ and higher oxides of nitrogen, all of which are known collectively as $NO_x$.

$NO_x$ has been identified as a principal intermediate compound in the generation of photochemical smog. When the atmospheric $NO_x$ is irradiated, particularly with ultraviolet light, ozone is released and the characteristic light occlusion, odor and deleterious action ensues.

Because $NO_x$ is such a contributing factor in air pollution, governments have applied increasingly strict standards on its emission from internal combustion engines.

The operating conditions of an internal combustion engine such as, for example, a gas turbine, can be adjusted for minimizing $NO_x$ emissions. However, the adjustment is critically related to the load being driven by the gas turbine engine, and adjustment which minimizes $NO_x$ emissions at one load value is unsatisfactory as the load changes upward and downward. When a gas turbine is employed in an application having a constant output load such as, for example, in driving a generator used as a base load source for an electric utility, reasonable levels of $NO_x$ can be achieved by careful adjustment of operating conditions. The same is not true for a gas turbine employed in a peaking system by an electric utility. By its nature, a peaking system is required to rapidly respond to changes in load both above and below a normal output point. In fact, when a peaking system is operated as spinning reserve, its output load is essentially zero. When an increased demand is sensed by the utility, the peaking system must rapidly respond by increasing its electric power output from zero to some finite value which may then rapidly vary upward and downward with changing load.

The prior art contains disclosure of a number of techniques for reducing atmospheric pollutants in flue gas. For example, U.S. Pat. No. 4,293,521 discloses adding sodium hydroxide (NaOH) to a flue gas for reaction with pollutants to produce solid precipitates which can be removed from the flue gas such as, for example, by a cyclone separator, before the remaining gas is exhausted to atmosphere.

U.S. Pat. No. 3,977,836 discloses the use of ammonia ($NH_3$) in the presence of a catalyst to reduce $NO_x$ in the flue gas to nitrogen gas plus water. This patent discloses the difficulty of measuring ammonia and, in fact, discusses the measurement of ammonia by reacting it with an excess quantity of $NO_x$ in the presence of a catalyst to determine the amount of ammonia present by the decrease in $NO_x$.

In a base load system, it would be possible to add $NH_3$ to the gas turbine exhaust in a molar ratio which would minimize $NO_x$ in the effluent. In order to do so, measurement of $NO_x$ in the effluent would be used as a guide in adjusting the flow of $NH_3$ into the gas turbine exhaust. However, measurement of $NO_x$ with available analyzers such as, for example, chemi-luminescent infrared or constant potential electrolytical techniques are relatively slow, requiring on the order of a minute or more for completion not including the transport time of the gas from the sensing location to an analyzer. Under a rapidly changing load, response times on this order may permit the discharge of excessive $NO_x$ or $NH_3$.

Residual ammonia in the effluent of a gas turbine represents a significant pollution factor on its own.

$NO_x$ emission standards are being applied in some locations in the world which exceed the ability of even an ammonia and catalyst system operating as previously described to achieve.

The thermal efficiency of a system employing a gas turbine can be significantly improved by recovering the waste heat in the gas turbine exhaust for the production of steam and by using this steam to run a steam turbine. Some steam turbine and gas turbine combined cycle systems known under the General Electric Co. trademark STAG employ a heat recovery steam generator (HRSG) through which the hot gas turbine exhaust passes on its way to the atmosphere. One or more stages of economizer and steam generator as well as possible superheaters are employed in the heat recovery steam generator for feeding a steam turbine of one or more stages. The outputs of the steam and gas turbines may be combined in a single load or, alternatively, may be applied to different loads. One may be employed to drive an electric generator, and the other employed to power other apparatus. Alternatively, both turbines may be coupled to the rotor of the same electric generator for combining the power output. Other applications include the generation of electricity by the gas turbine and the use of the steam for non-motive power such as for heating or industrial processes.

As the exhaust gas from the gas turbine passes through the heat recovery steam generator, its temperature is reduced from the range of from about 800° F. to about 1,100° F. to about 300° F. by heat transfer to the steam generators and economizers. The catalytic reactor is located in the HRSG and is designed to operate efficiently within the aforesaid temperature range.

Automatic control systems for gas turbines make available a number of measured and calculated operating parameters. U.S. Pat. No. 3,520,133, herein incorporated by reference, discloses one type of automatic gas turbine control system.

OBJECTS AND SUMMARY OF THE INVENTION

Accordingly, it is an object of the invention to provide a control system for the injection of ammonia into an exhaust flow from a gas turbine which overcomes the drawbacks of the prior art.

It is a further object of the invention to provide an ammonia control system which maintains an acceptable level of $NO_x$ emission from a heat recovery steam generator in a STAG plant operated under varying load conditions.

It is a further object of the invention to provide an ammonia control system for a STAG plant employing a predicted $NO_x$ signal based on gas turbine operating conditions as an element of the control.

It is a further object of the invention to provide an ammonia control system employing a predicted $NO_x$ value developed as a consequence of gas turbine operating conditions and a measured $NO_x$ value derived from a gas sample taken from the exhaust gas flow from the gas turbine.

According to an aspect of the present invention, there is provided an ammonia control system for controlling a flow of ammonia into an exhaust of a fuel combustion apparatus to enable reaction of $NO_x$ in the exhaust with the ammonia in a catalyst for reduction of $NO_x$ effluent into the atmosphere, the apparatus being effective to produce a predicted $NO_x$ signal related to parameters in the combustion apparatus and at least one $NO_x$ setpoint signal representing a desired $NO_x$ condition downstream of the catalyst, a $NO_x$ analyzer producing a measured $NO_x$ signal related to a relative volume concentration of $NO_x$ downstream of the catalyst, comprising means for converting the measured $NO_x$ signal in terms of relative volume concentration into a $NO_x$ flow rate in terms of moles of $NO_x$ per unit time, the at least one $NO_x$ setpoint signal being in terms of moles of $NO_x$ per unit time, means for differencing the converted measured $NO_x$ flow rate and the $NO_x$ setpoint signal to produce a $NO_x$ error signal, means for producing a mole ratio signal of ammonia to $NO_x$ in response to the $NO_x$ error signal, means for multiplying the mole ratio signal by the predicted $NO_x$ signal to produce an ammonia command signal, and an ammonia supply responsive to the ammonia command signal for injecting ammonia into the exhaust.

According to a feature of the present invention, there is provided a method for controlling a flow of ammonia into an exhaust of a fuel combustion apparatus to enable reaction of $NO_x$ in the exhaust with the ammonia in a catalyst for reduction of $NO_x$ effluent into the atmosphere, the apparatus being effective to produce a predicted $NO_x$ signal related to parameters in the combustion apparatus and at least one $NO_x$ setpoint signal representing a desired $NO_x$ condition downstream of the catalyst, a $NO_x$ analyzer producing a measured $NO_x$ signal related to a relative volume concentration of $NO_x$ downstream of the catalyst, comprising the steps of converting the measured $NO_x$ signal in terms of relative volume concentration into a $NO_x$ flow rate in terms of moles of $NO_x$ per unit time, differencing the converted measured $NO_x$ flow rate and the $NO_x$ setpoint signal to produce a $NO_x$ error signal, producing a mole ratio signal of ammonia to $NO_x$ in response to the $NO_x$ error signal, multiplying the mole ratio signal by the predicted $NO_x$ signal to produce an ammonia command signal, and injecting the ammonia into the exhaust in response to the ammonia command signal.

DETAILED DESCRIPTION OF THE PREFERRED EMBODIMENT

Figure 1:
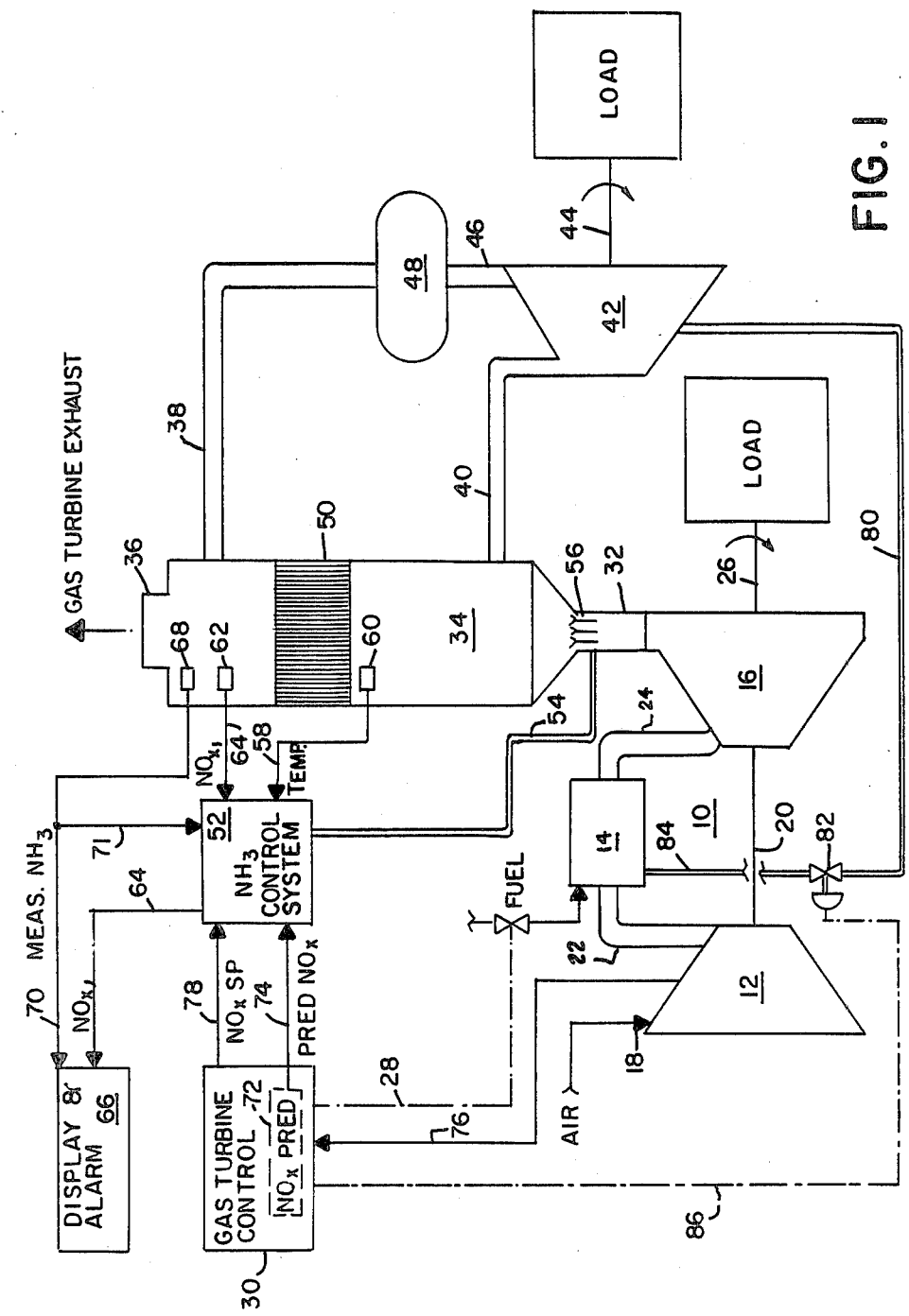
FIG. 1 is a simplified schematic diagram of a steam turbine and gas turbine system according to an embodiment of the present invention.

Referring now to FIG. 1, a conventional gas turbine, shown generally at 10, includes a compressor 12, a combustor 14 and a turbine 16.

Air fed to an inlet 18 of compressor 12 is compressed by power fed back on a mechanical connection 20 from turbine 16. The compressed air is fed through a conduit 22 to combustor 14. Fuel is fed to combustor 14 where it is burned in the presence of the compressed air to produce energetic hot gas which is fed in a conduit 24 to turbine 16. The rapidly moving hot gas is expanded in turbine 16 to drive one or more turbine stages to produce torque on an output shaft 26 for application to a load as well as torque on mechanical connection 20 for driving compressor 12.

Gas turbine 10 is conventional and includes a number of controls, interlocks and fuel feed elements which, being conventional, are neither shown nor described in FIG. 1 but one skilled in the art would recognize the need for them in a conventional system and would not be deterred from making and using the present invention from their omission herein. To illustrate such control, a line 28 from a controller 30 to combustor 14 is symbolic of the control of, for example, fuel flow to combustor 14 and thereby control of the power output of gas turbine 10. Controller 30 has other functions in connection with the present invention to be described hereinafter.

Exhaust gases from turbine 16 pass through an exhaust conduit 32 into a heat recovery steam generator 34. Except for specific elements to be described hereinafter, heat recovery steam generator 34 is conventional and may include one or more heat exchanger tubes with associated pumps, valves and piping both internally and externally which are herein omitted for clarity of presentation. After passing through heat recovery steam generator 34 the gas turbine exhaust exits an exhaust stack 36 to the atmosphere.

Feed water counterflows in heat recovery steam generator 34 from a feed water conduit 38 nearer exhaust stack 36 to emerge as steam or superheated steam at a steam conduit 40 nearer exhaust conduit 32. Steam conduit 40 conducts the steam to a steam turbine 42 wherein the steam is expanded to produce output power on an output shaft 44. Spent steam from steam turbine 42 is conveyed via a conduit 46 to a condenser 48 wherein the steam is condensed to provide feed water for feed water conduit 38.

Although only a single steam conduit 40 feeding steam turbine 42 is shown, it would be clear to one skilled in the art that steam turbine 42 may consist of more than one stage.

A catalyst 50 which may be of any convenient type effective for reacting $NO_x$ and $NH_3$ to produce predominantly molecular nitrogen and water is located in heat recovery steam generator 34. Catalyst 50 is preferably a porous structure employing, for example, a corrugated material made up into blocks such as a catalyst sold under the trademark Noxnon by Hitachi Zosen Corp.

The gas turbine exhaust entering heat recovery steam generator 34 from exhaust conduit 32 has a temperature of from about 480° to about 1,050° F. and is cooled on its passage through heat recovery steam generator 34 to a temperature of about 250° F. when it exits exhaust stack 36. Catalyst 50 is placed in a location in heat recovery steam generator 34 at which an appropriate temperature for effective catalyst operation is prevalent. A catalyst temperature in the range of from about 150° to about 500° C. is required depending upon the catalyst employed. Excessive temperatures with some catalysts can drive off the $NH_3$ absorbed thereon and recovery may take several minutes to several tens of minutes. Catalyst temperatures which are too low may fail to produce the desired chemical reaction or may produce the chemical reaction with an efficiency which is so low that a large part of the $NO_x$ is emitted through an exhaust stack 36.

An $NH_3$ control system 52 supplies $NH_3$ on a conduit 54 to a plurality of spray elements 56 located in exhaust conduit 32. $NH_3$ control system 52 receives a temperature signal on a line 58 from a temperature sensor 60 located in the heat recovery steam generator 34 preferably just upstream of catalyst 50. The temperature signal from temperature sensor 60 should thus be closely related to the temperature of catalyst 50. A $NO_x$ sensor 62 in heat recovery steam generator 34 produces a signal corresponding to the concentration of $NO_x$ in the exhaust on a line 64 for application to $NH_3$ control system 52 and a display and alarm 66. $O_2$ is calculated in the gas turbine control and applied separately to the control system. An $NH_3$ sensor 68 is optionally provided for producing a signal on a line 70 proportional to the concentration of $NH_3$ in the exhaust. The $NH_3$ signal is also applied to display and alarm 66.

The $NO_x$ sensor 62 is preferably located outside heat recovery steam generator 34 and is supplied with gas samples from a probe which is appropriately positioned in the gas flow leading to exhaust stack 36. The sample is then conveyed to the analyzers, preferably in tubing. Although a gas transport time of from a few seconds to a minute or more is entailed in such gas transport, location of the analysis equipment in a stable and controlled environment is necessary for accurate results and for accessibility for calibration and maintenance.

A $NO_x$ predictor 72 produces a predicted $NO_x$ signal based on internal parameters and on sensed parameters which is applied on a line 74 to $NH_3$ control system 52. $NO_x$ predictor 72 receives inputs including temperature, pressure, flow and humidity signals on a line 76 from compressor 12. Based on its inputs, the predicted $NO_x$ signal applied from $NO_x$ predictor 72 on line 74 to $NH_3$ control system 52 rapidly responds to changes in operating conditions within from about 1 to about 10 seconds after a change occurs. Thus, $NH_3$ control system 52 is capable of modulating the amount of $NH_3$ fed on conduit 54 to spray elements 56 based on rapidly updated information.

Controller 30 produces a $NO_x$ setpoint signal which is applied on a line 78 to $NH_3$ control system 52. The $NO_x$ setpoint signal may be generated by a manual control or by a computer responding to a stored program or external inputs.

$NO_x$ production in combustor 14 is a strong exponential function of temperature in a flame zone therein. One method of reducing temperature in the flame zone is the injection of steam in combustor 14. However, rather than correspondingly reducing the power output, steam injection slightly increases the power output due to the increased mass flow rate. Steam is transmitted on a line 80 from an appropriate point in the steam system arbitrarily shown as steam turbine 42 to a steam injection valve 82 from whence the steam is applied on a line 84 to combustor 14. Controller 30 produces a steam control signal on a line 86 for control of steam injection valve 82. As the power demand on gas turbine 10 changes, the amount of injected steam is correspondingly changed to reduce the magnitude of the excursions of $NO_x$ produced in combustor 14 to thereby reduce the variability which must be accommodated by $NH_3$ control system 52 and catalyst 50.

Briefly described, $NO_x$ in the exhaust from exhaust stack 36 is controlled by injected ammonia from $NH_3$ control system 52 based on the rapidly responding predicted $NO_x$ signal fed thereto from $NO_x$ predictor 72. It is believed that $NO_x$ predictor 72 can generate acceptably accurate predictions of the $NO_x$ produced in combustor 14 based on sensed and calculated parameters in gas turbine 10. It is, therefore, possible that responsive pollution control can be obtained by this control based on predicted $NO_x$ alone. However, it is possible that the predicted $NO_x$ signal may develop slight errors. In this case, the $NO_x$ signal from $NO_x$ sensor 62 may be employed to trim or fine tune the delivery of $NH_3$ to further reduce $NO_x$ emissions.

Figure 2:
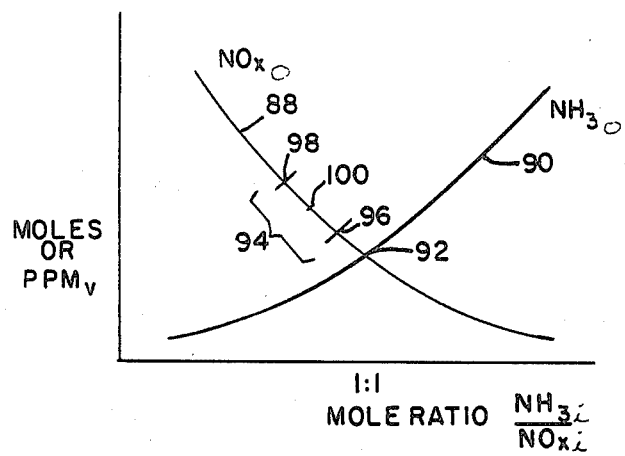
FIG. 2 is a set of curves relating ammonia and $NO_x$ emissions for varying ratios of these components in a STAG plant of FIG. 1.

Referring now to FIG. 2, there is shown a curve representing the amount of $NO_x$ and $NH_3$ in the exhaust from a catalytic reactor. That is, as the amount of $NH_3$ is increased, the $NO_x$ is reduced. The units of $NO_x$ and $NH_3$ are in relative volume concentration. A $NO_x$ curve 88 decreases from left to right as an $NH_3$ curve 90 increases from left to right. At their crossover point 92, an optimum is attained at which minimum overall pollution resulting from $NO_x$ and $NH_3$ emission is attained. When circumstances require the presence of a surplus of $NO_x$, an operating range 94 is employed which has a minimum $NO_x$ value 96 which remains above crossover point 92 to thereby maintain a volume concentration of $NO_x$ greater than $NH_3$ in the exhaust. A maximum $NO_x$ value 98 defines the upper end of operating range 94. A setpoint 100 is selected by controller 30 (FIG. 1) for application on line 78 to $NH_3$ control system 52 which positions operating range 94 as shown over the range of expected control errors.

Figure 3:
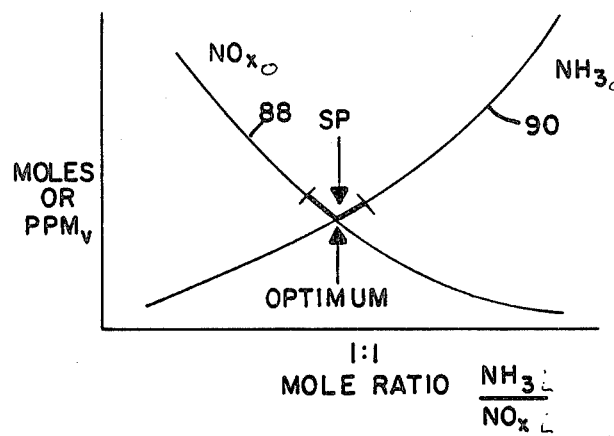
FIG. 3 is a set of curves relating mole ratio of ammonia and $NO_x$ for a second control rule.

A control setpoint at the crossover point as shown in FIG. 3 may be employed with $NH_3$ control errors resulting in variations above and below the crossover point. This type of control could be enhanced by employing a measurement of $NH_3$ in the exhaust along with the measurement of $NO_x$. The desired setpoint is achieved when the amounts of $NH_3$ and $NO_x$ are equal. $NH_3$ sensing apparatus of the required sensitivity, accuracy and reliability has not been qualified in the type of service anticipated. However, as seen in FIG. 1, provision can be made, as shown by an optional line 71 from line 70 to $NH_3$ control system 52 to provide a measure of $NH_3$ to $NH_3$ control system 52 for combination with the $NO_x$ measurement either as a primary control or as a trimming signal.

Figure 4:
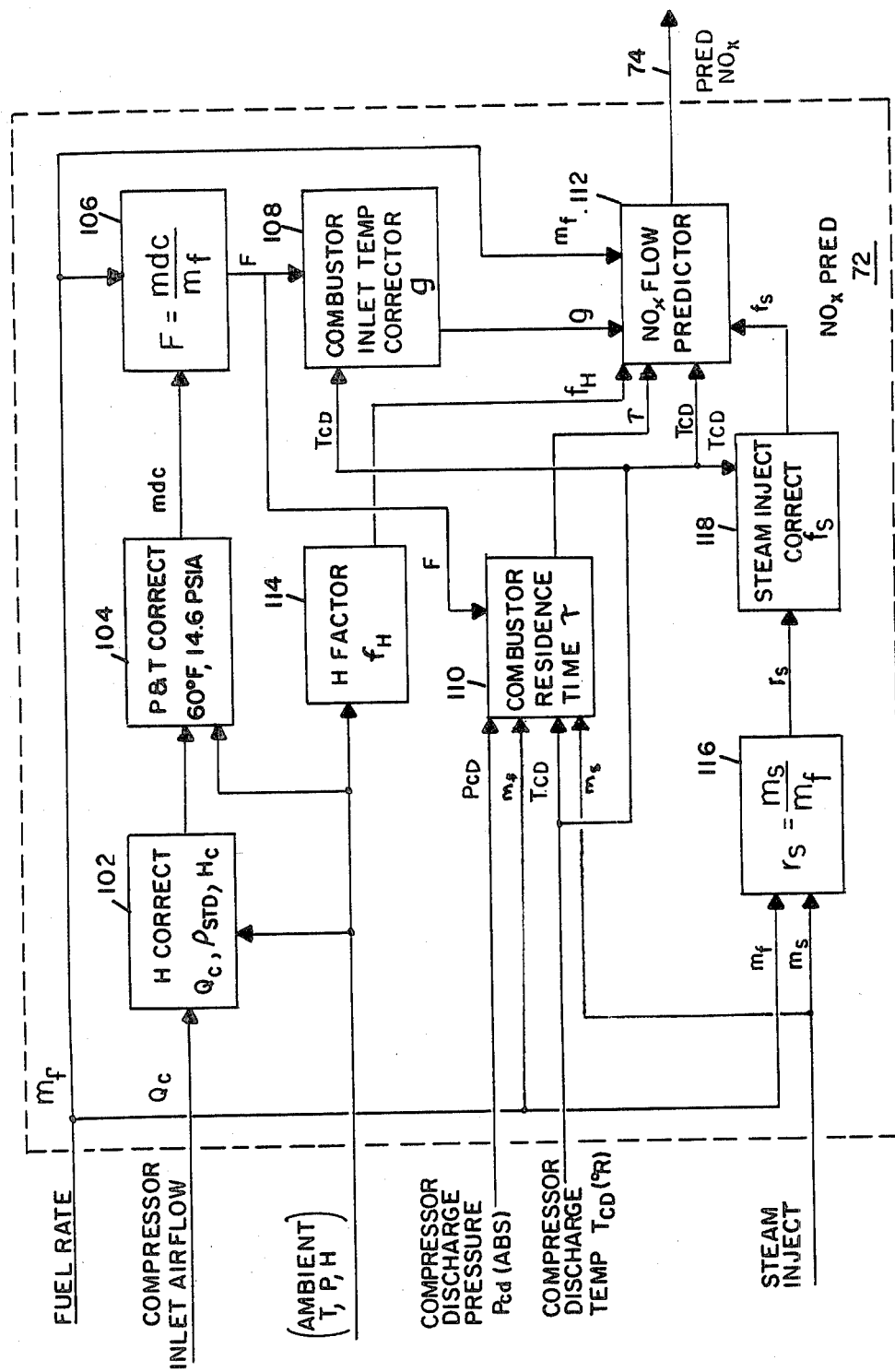
FIG. 4 is a block diagram of a $NO_x$ predictor of FIG. 1.

Referring now to FIG. 4, $NO_x$ predictor 72 operates on measured or inferred quantities to produce the predicted $NO_x$ signal on line 74. The final equation which produces the predicted $NO_x$ signal is as follows:

$$MNO_x = \frac{Amf}{(1 + B\tau)} \cdot f_H \cdot f_s \cdot \exp(C\Delta T_{CD}+g)$$

The measured quantities, calculations and constants which are employed in the calculation are defined in the following:

(1) $Q_C$ = Compressor inlet airflow (ft$^3$/sec)
(2) $P_{CD}$ = Compressor discharge press (PSIA)
(3) $T_{CD}$ = Compressor disch. temperature (°R.)
(4) $\Delta T_{CD} = T_{CD} - T_o$ (°R.)
(5) mf = Mass fuel flow (lbm/sec)
(6) ms = Mass steam injection flow (lbm/sec)
(7) H = Ambient specific humidity (lbm H$_2$O/lbm dry air)
(8) $P_A$ = Ambient pressure (PSIA)
(9) $T_A$ = Ambient temperature (°R.)
(10) $T_{std}$ = 519° R.
(11) $P_{std}$ = 14.696 psia
(12) $\rho_{std}$ = 0.07648 lbm/ft$^3$

(13) $\dot{m}_{dc}$ = Dry compressor inlet airflow (lbm/sec)

$$= Q_c \rho_{std} H_c \frac{P_A}{P_{std}} \frac{T_{std}}{T_A}$$

(14) $H_c$ = Humidity correction factor
   $= 1 - 1.608H/(1 + 1.608H)$
(15) F = Dry fuel to dry air mass ratio $= \dot{m}_f/\dot{m}_{dc}$

(16) $\tau$ = Relative residence time in combustor $= P_{CD}/((\dot{m}_{dc} + \dot{m}_f + \dot{m}_s)T_{CD})$

(17) g = Combustor inlet temperature corrector
   $= \partial (F - F_o)^2/T_{CD}$
(18) $f_H$ = Humidity factor
   $= \exp[-19(H-0.006343)]$
   $f_s$ = Steam injection correction
   $= \exp[(b + c\Delta T_{CD})r_s/(1 + d\,r_s)]$
(20) $r_s$ = Steam to fuel mass ratio (lbm/lbm)

$= \dot{m}_s/\dot{m}_f$

(21) $MNO_x$ = Predicted NO$_x$ flow (lbm/sec)
(22) a, b, c, d, A, B, C, $T_o$, $F_o$ are constants which depend on the specific system, operating point, etc. In addition, A,C,a,b, and c depend upon the specific hydrocarbon, or hydrocarbons which comprise the fuels. Adjustment for different fuel composition may be made automatically or manually.

A humidity corrector 102 multiplies the measured compressor inlet air flow $Q_c$ by a standard air density $\rho_{std}$ and by humidity correction factor $H_c$ to eliminate the effect of ambient humidity from the resulting value. $\rho_{std}$ and $H_c$ are defined in the preceding.

The humidity corrected value is applied from humidity corrector 102 to a pressure and temperature corrector 104. The ambient pressure $P_A$ is divided by a standard pressure $P_{std}$ and a standard temperature $T_{std}$ is divided by ambient air temperature $T_A$ and these ratios are multiplied by the humidity correction factor $H_c$ from humidity corrector 102 to produce a dry air flow mass $m_{dc}$ referred to standard conditions.

A fuel/air ratio calculator 106 divides a measured or inferred fuel rate $m_f$ by the dry air flow mass $m_{dc}$ to derive a dry fuel to air mass ratio F.

The calculated fuel/air ratio F is applied to inputs of a combustor inlet temperature corrector 108.

Combustor inlet temperature corrector 108 receives a signal related to the compressor discharge temperature $T_{CD}$ at its second input and calculates therefrom the combustor inlet temperature correction factor g which is applied to an input of a NO$_x$ flow predictor 112. The mass fuel flow signal $m_f$ is also applied to NO$_x$ flow predictor 112.

Compressor discharge temperature $T_{CD}$ is applied to combustor residence time calculator 110 as is the measured compressor discharge pressure $P_{CD}$, the steam injection mass flow, ms, and the fuel flow rate, mf. A relative residence time $\tau$ is calculated from these inputs as indicated in the preceding and is applied to NO$_x$ flow predictor 112.

A humidity factor calculator 114 produces a factor $f_H$ as indicated in the preceding for application to NO$_x$ flow predictor 112 to compensate the NO$_x$ flow prediction for atmospheric humidity.

A steam-to-fuel ratio calculator 116 takes mass flow ratios of injected steam and fuel to produce a steam-to-fuel ratio signal $r_s$ which is applied to a steam injection correction calculator 118. Steam injection correction calculator 118 also receives a compressor discharge temperature signal $T_{CD}$ and produces therefrom a steam injection correction signal $f_s$ according to the equations in the preceding which is applied to NO$_x$ flow predictor 112. The compressor discharge temperature signal $T_{CD}$ is also applied to NO$_x$ flow predictor 112. The predicted NO$_x$ signal on line 74 is calculated according to the foregoing equations.

NO$_x$ predictor 72 may be implemented with any suitable hardware including analog or digital circuits which may be either discrete components or integrated. In the preferred embodiment, NO$_x$ predictor 72 is implemented employing a microprocessor with appropriate input and output signal conditioning apparatus as well as such necessary multiplexer and demultiplexer devices as are necessary and which are obvious to one having ordinary skill in the art based upon the information given.

Figure 5:
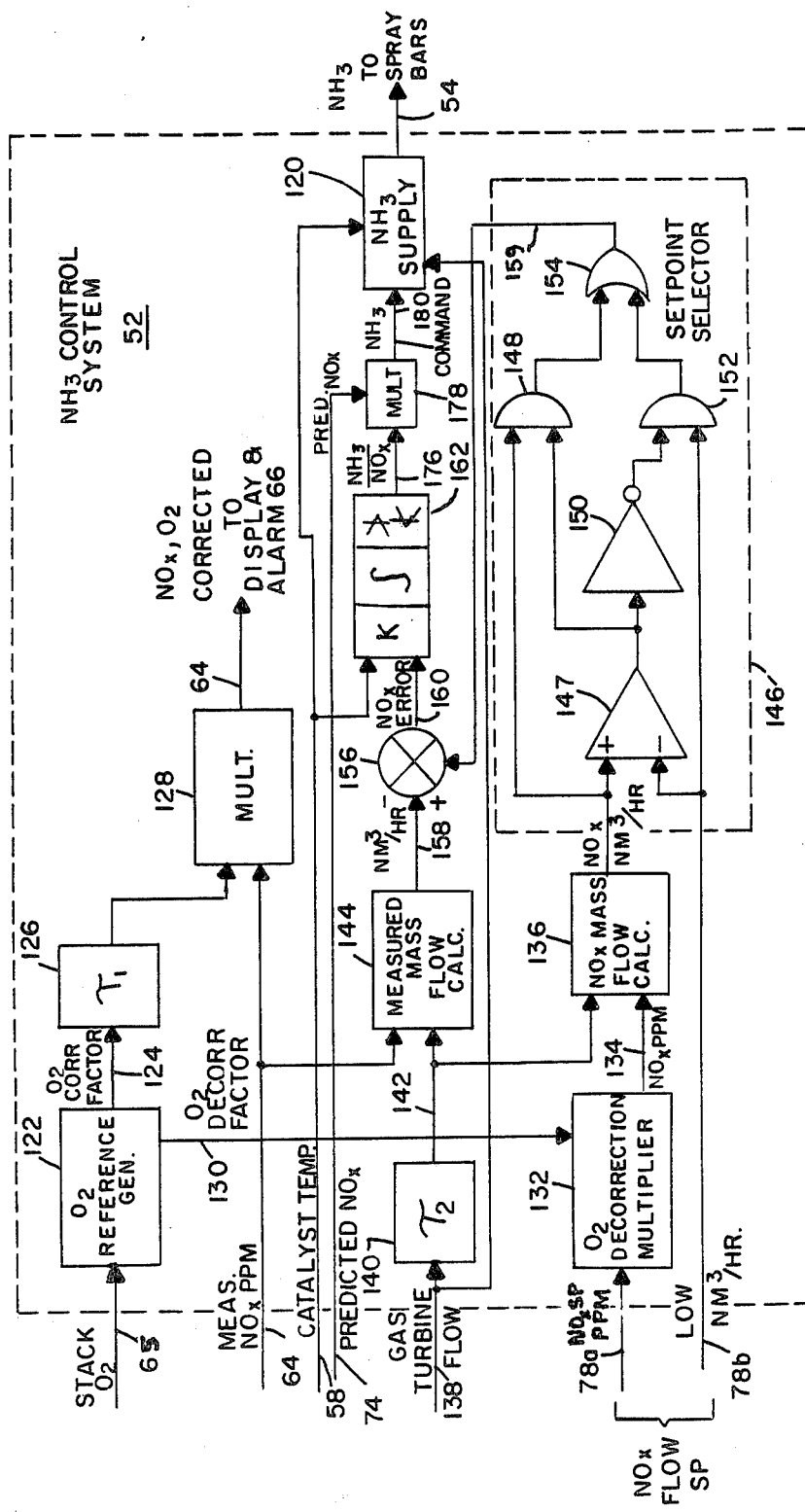
FIG. 5 is a block diagram of an $NH_3$ control system of FIG. 1.

Referring now to FIG. 5, NH$_3$ control system 52 basically compares the measured NO$_x$ mass flow on line 158 with a setpoint signal from one of lines 78a and 78b as selected, on line 159 to develop a signal which controls the delivery of ammonia from an NH$_3$ supply 120 through conduit 54 to spray bars or elements 56 (FIG. 1). Before this comparison and control can be done, however, the predicted and setpoint values must be adjusted so that they have consistent units for direct comparison. In addition, delays must be employed to relate data from different sources so that corresponding effects can be combined at the time relative to their occurrence in the process.

The outputs of conventional NO$_x$ analyzers provide a measure of the percentage volume flow of NO$_x$ (dry) in the exhaust stream. As previously noted, atmospheric oxygen comprises approximately 21 percent of air by volume. Reaction in a gas turbine reduces the amount of air in the gas due to its combination with fuel and the formation of NO$_x$ compounds. At rated load and with operating conditions adjusted for efficient operation, a gas turbine produces an exhaust having, for example, about 15 percent oxygen. Such normal amount may be employed as an oxygen reference against which the stack O$_2$ can be compared. Stack O$_2$ is applied on line 65 to an O$_2$ reference generator 122 which produces an O$_2$ correction factor which is applied on a line 124 to a time delay 126 having a delay time $\tau_1$ equal to the difference in response times of the O$_2$ calculation and the NO$_x$ sensor. The delayed output of time delay 126 is applied to one input of a multiplier 128. The measured $NO_x$ concentration on line 64 is applied to a second input of multiplier 128. An output of multiplier 128, which represents measured $NO_x$ corrected for oxygen, is applied on a line 64 to display and alarm 66.

$O_2$ correction factor may have the following form:

$$O_2 \text{ correction factor} = (0.21 - O_n)/(0.21 - O_s)$$

where:
$O_n$ = reference $O_2$
$O_s$ = measured $O_2$

Since time delay 126 delays the oxygen correction factor for a time $\tau_1$ equal to the difference in response times of the $O_2$ calculation and $NO_x$ sensor, the output of multiplier 128 represents the result of these two factors occurring at a single time in the past. By correction of the measured $NO_x$ for $O_2$, display and alarm 66 may directly compare $O_2$ corrected $NO_x$ values.

$O_2$ reference generator 122 also produces an $O_2$ decorrection factor which is applied on a line 130 to an $O_2$ decorrection multiplier 132. The other input of $O_2$ decorrection multiplier 132 receives a setpoint $NO_x$ value on a line 78a which is provided in units of PPM referenced to a fixed percent of $O_2$. The setpoint value on line 78a produced in controller 30 (FIG. 1) does not contain the effects of $O_2$ on the $NO_x$ reading. The $O_2$ decorrection factor on line 130, therefore, inserts a factor in the $NO_x$ setpoint so that the output of $O_2$ decorrection multiplier 132 is in the form of $NO_x$ in PPM. The form of the $O_2$ decorrection factor is as follows:

$$O_2 \text{ decorrection factor} = (0.21 - O_s)/(0.21 - O_n)$$

It will be noted that the $O_2$ decorrection factor is the inverse of the $O_2$ correction factor. The output of $O_2$ decorrection multiplier 132, which represents a $NO_x$ setpoint in parts per million, is applied on a line 134 to an input of a $NO_x$ mass flow calculator 136.

The measured or calculated gas turbine flow is applied on a line 138 to an input of a time delay 140 having a delay time of $\tau_2$ which is equal to the difference between the response time of the $NO_x$ analyzer and the time required for a gas sample to pass from the point at which gas turbine flow is measured to the point at which the $NO_x$ sample is drawn. The delayed output of time delay 140 is applied on a line 142 to a measured mass flow calculator 144 and to an input of $NO_x$ mass flow calculator 136. In $NO_x$ mass flow calculator 136, the $NO_x$ setpoint in PPM is multiplied by the delayed gas turbine flow signal, line 142, to produce a $NO_x$ setpoint in volume flow units of $NM^3/HR$. This setpoint value is applied to a setpoint selector 146. A minimum setpoint in $NM^3/HR$ is applied on a line 78b to setpoint selector 146.

Setpoint selector 146 compares the output of $NO_x$ mass flow calculator 136 with the low $NO_x$ flow setpoint on line 78b and, if the output of $NO_x$ mass flow calculator 136 exceeds the low $NO_x$ flow setpoint, the high $NO_x$ flow setpoint is used in succeeding circuits and the low $NO_x$ setpoint is inactive. Conversely, if the output of $NO_x$ mass flow calculator 136 is less than the low $NO_x$ setpoint, the low $NO_x$ setpoint is employed and the high $NO_x$ setpoint is inactive. For example, a comparator 147 receives the $NO_x$ SP and low $NO_x$ setpoints at its inputs. An AND gate 148 receives the $NO_x$ setpoint and the output of comparator 147. The output of comparator 147 is inverted in an inverter 150 and the result is applied to one input of an AND gate 152. The other input of AND gate 152 receives the low $NO_x$ setpoint. Outputs of AND gates 148 and 152 are applied to an OR gate 154 whose output is applied to a plus input of an adder 156.

Although elements 148 and 152 are shown as AND gates, they are, in reality, switches which, when enabled by a logic level at one input from comparator 147 and inverter 150 respectively, apply to their outputs an analog signal proportional to their inputs. When their control inputs are inhibited, their inputs and outputs are disconnected. Thus, the output of OR gate 154 is an analog value related to either the $NO_x$ SP or the low limit setpoint value.

Measured mass flow calculator 144 multiplies the measured $NO_x$ signal in PPM, by the delayed gas turbine flow signal to produce a $NO_x$ flow in $NM^3/HR$ which is applied on a line 158 to a minus input of adder 156. It should be noted that both inputs to adder 156 are in $NO_x$ mass flow units of $NM^3/HR$. The output of adder 156, representing the error between the selected $NO_x$ setpoint and the measured $NO_x$ is applied on a line 160 to a proportional plus integral controller with limits 162.

Referring momentarily to FIG. 1, spray elements 56 inject ammonia into the turbine exhaust flow in exhaust conduit 32 in a mole ratio of $NH_3$ to $NO_x$ at that point which will minimize the $NO_x$ output at exhaust stack 36 after the mixture has passed through, and reacted with, catalyst 50. It will be noted, however, that the $NO_x$ is not measured at this point but, instead, is measured downstream of catalyst 50 near exhaust stack 36. The reasons that $NO_x$ is measured near exhaust stack 36 rather than in the vicinity of spray bars 56 include the elevated temperature and large flow area in exhaust conduit 32 which make accurate measurement of $NO_x$ at this point difficult to perform. After the cooling and mixing of the gases in traversing heat recovery steam generator 34 and catalyst 50, a representative sample is more easily taken at the location of $NO_x$ sensor 62. However, the fact that the $NO_x$ being measured at $NO_x$ sensor 62 is the amount remaining after reaction in catalyst 50, rather than the amount to which ammonia is added in spray elements 56, places the requirement on $NH_3$ control system 52 to infer the $NO_x$ quantity at spray elements 56 from the measured quantity at $NO_x$ sensor 62 and to derive therefrom a required delivery rate of ammonia.

Figure 7:
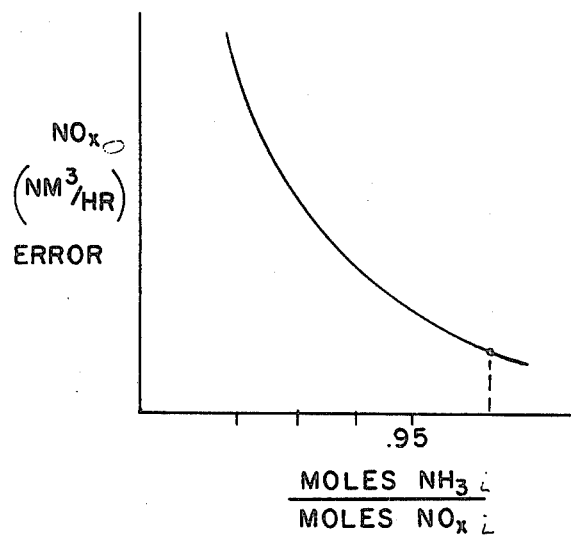
FIG. 7 is a curve relating mole ratio of $NH_3$ and $NO_x$ to $NO_x$ in the emission from the STAG plant of FIG. 1.
Figure 6:
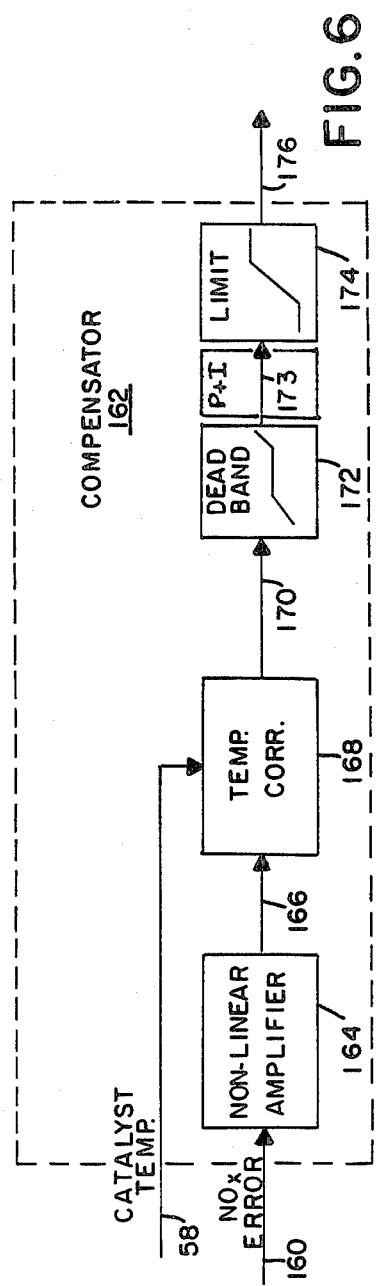
FIG. 6 is a block diagram of a compensator of FIG. 5.

Referring now to FIG. 7, the amount of $NO_x$ remaining in the gas downstream of catalyst 50 depends on the mole ratio of ammonia to $NO_x$ at spray elements 56 assuming a value for the efficiency of catalyst 50. Thus, a $NO_x$ error on line 160 (FIG. 6) downstream of catalyst 50 can be interpreted in terms of the ammonia/$NO_x$ mole ratio existing at spray element 56 assuming a catalyst efficiency. Referring again to FIG. 6, the $NO_x$ error on line 160 may be applied alternatively to a non-linear amplifier having a response shaped according to the relationship of FIG. 7. This embodiment represents an alternative to the P & I controls of FIG. 5. Thus, for a given $NO_x$ error on line 160, non-linear amplifier 164 modifies $NO_x$ error 160 by a gain value which is the slope of the curve shown in FIG. 7. The $NO_x$ error 160 is thereby transferred into units of inlet mole ratios. This mole ratio signal is applied to a temperature corrector 168. The signal related to the catalyst temperature on line 58 is also applied to temperature corrector 168. As is well known, the efficiency of a catalyst is related to its temperature. That is, the amount of $NO_x$ which catalyst 50 is capable of reducing is dependent upon the catalyst temperature. At low catalyst temperatures, catalyst 50 is essentially incapable of reacting any ammonia and there is, therefore, no purpose served in injecting ammonia into the exhaust gas stream. At higher temperatures, the catalyst becomes more and more efficient and, therefore, warrants the addition of increasing quantities of ammonia until a temperature range is reached at which maximum catalyst efficiency is attained. Temperature corrector 168 applies a nonlinear gain function to the mole ratio signal received on line 166 whereby at low catalyst temperatures the gain is essentially zero and no ammonia is injected. At increasing temperatures, the gain increases in a fashion which substantially follows the ability of the catalyst to react the $NO_x$ and ammonia. The resulting output of temperature corrector 168 is applied on a line 170 to a dead band generator 172 which tends to reduce the variability of the output signal about a nominal range. The output of dead band generator 172 is applied through a P & I controller 173 to a limiting circuit 174 which limits both the positive and negative excursions which the output signal applied to line 176 can achieve. This prevents excessive excursions either positive or negative of ammonia delivery and consequently limits both $NO_x$ and $NH_3$ emissions.

Returning now to FIG. 5, the inlet mole ratio signal on line 176 is applied to one input of a multiplier 178. The gains in controller 162 are such that the signal on line 176 applied to multiplier 178 are properly scaled for multiplication with the predicted $NO_x$ signal on line 74 applied to the other input of multiplier 178. The product of these two quantities, therefore, eliminates the $NO_x$ germ from the ratio and produces an $NH_3$ command signal which is applied on a line 180 to $NH_3$ supply 120.

Figure 8:
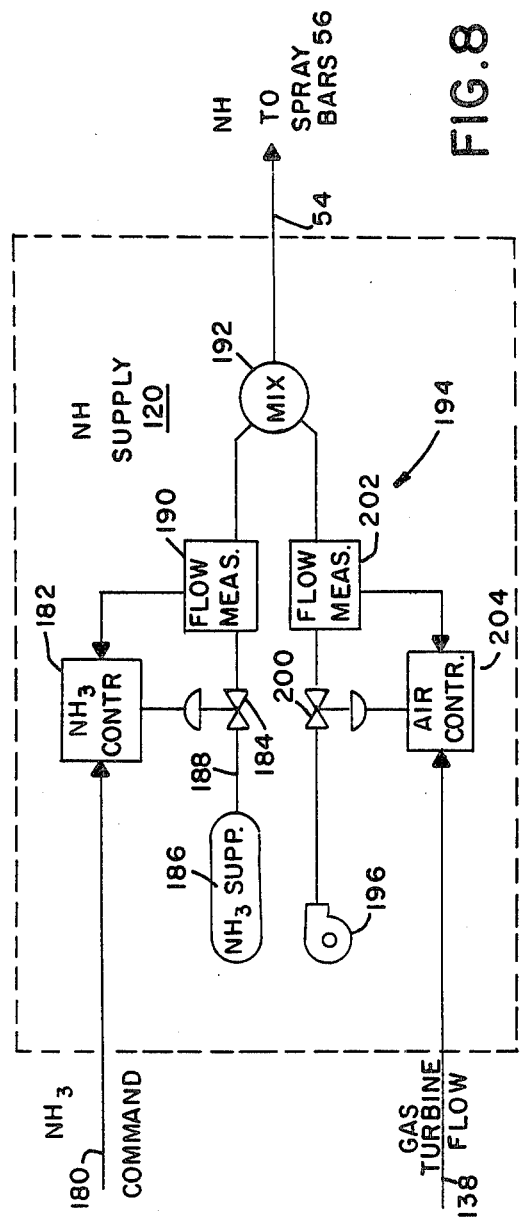
FIG. 8 is a schematic diagram of an $NH_3$ supply of FIG. 5.

Referring now to FIG. 8, $NH_3$ supply 120 receives the $NH_3$ command signal on line 180 in an $NH_3$ controller 182. $NH_3$ controller 182 applies an actuating signal to a control valve 184. An $NH_3$ supply 186 which may be of any convenient type such as a pressurized reservoir as shown or any other appropriate storage or generator apparatus, supplies pressurized $NH_3$ on a conduit 188 to control valve 184. Control valve 184, in response to the actuating signal from $NH_3$ controller 182, meters a flow of $NH_3$ through a flow measurement apparatus 190 to a mixer 192. The output of mixer 192 is applied on conduit 54 to spray bars 56. Flow measurement apparatus 190 provides a feedback signal to $NH_3$ controller 182 to achieve closed loop control of $NH_3$ control valve 184.

At high values of gas turbine flow, it is possible that the delivery rate of $NH_3$ may not be sufficient to adequately atomize and mix the $NH_3$ with the turbine gas flow so that full advantage can be taken of available catalyst efficiency. In order to ensure that sufficient mass flow is directed to spray bars 56, an auxiliary air supply, shown generally at 194, may be provided. A blower 196 provides a flow of pressurized air on a conduit 198 through an air control valve 200 and f flow measurement apparatus 202 to a second input of mixer 192 where the air is mixed with the $NH_3$ before delivery to spray bars 56.

In one embodiment of the invention, a constant air flow from blower 196 is employed. In a second embodiment, the air flow in auxiliary air supply 194 is related to gas turbine flow. In this case, an air controller 204 receives a signal on line 138 related to gas turbine flow and actuates air control valve 200 in response thereto.

Flow measurement apparatus 202 provides a feedback signal to air controller 204 so that closed loop control of air control valve 200 can be achieved. The combined flow of $NH_3$ and air, mixed in mixer 192, provides an adequate combined flow rate at spray elements 56 to energetically inject the $NH_3$ into the gas flow.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An ammonia control system for controlling a flow of ammonia into an exhaust of a fuel combustion apparatus to enable reaction of $NO_x$ in said exhaust with said ammonia in a catalyst for reduction of $NO_x$ effluent into the atmosphere, including a controller effective to produce a predicted $NO_x$ signal related to parameters in said combustion apparatus and at least one $NO_x$ setpoint signal representing a desired $NO_x$ condition downstream of said catalyst, a $NO_x$ analyzer producing a measured $NO_x$ signal related to a relative volume concentration of $NO_x$ downstream of said catalyst, comprising:

means for converting said measured $NO_x$ signal in terms of relative volume concentration into a $NO_x$ flow rate in terms of moles of $NO_x$ per unit time;

said at least one $NO_x$ setpoint signal being in terms of moles of $NO_x$ per unit time;

means for differencing the converted measured $NO_x$ flow rate and the $NO_x$ setpoint signal to produce a $NO_x$ error signal;

means for producing a mole ratio signal of ammonia to $NO_x$ in response to said $NO_x$ error signal;

means for multiplying said mole ratio signal by said predicted $NO_x$ signal to produce an ammonia command signal; and an ammonia supply responsive to said ammonia command signal for injecting ammonia into said exhaust.

2. An ammonia control system according to claim 1, wherein said at least one $NO_x$ setpoint signal includes a first setpoint signal in terms of $NO_x$ relative volume concentration and a second setpoint signal in terms of moles of $NO_x$ per unit time, further comprising:

means for decorrecting said first setpoint signal for an amount of oxygen in said effluent to produce a decorrected signal;

means for time aligning a flow rate in said combustion apparatus with a response time of a $NO_x$ analyzer device to produce a time-aligned flow rate signal;

means for multiplying said decorrected signal by said time-aligned flow rate signal to produce a corrected first setpoint signal; and a setpoint selector effective to apply whichever one of said corrected first setpoint signal and said second setpoint signal is larger to said means for differencing.

3. An ammonia control system according to claim 2, wherein said means for time aligning includes a time delay having a delay time equal to a difference between a transport time of gas flow from a point where said flow rate is measured to a point where a sample for said $NO_x$ is taken and a response time of said $NO_x$ analyzer device.

4. An ammonia control system according to claim 1, wherein said means for producing a mole ratio signal includes a non-linear amplifier having an output proportional to a mole ratio of ammonia to $NO_x$ before reaction in said catalyst in response to said measured $NO_x$ signal.

5. An ammonia control system according to claim 1, wherein said means for producing a mole ratio signal includes a temperature corrector effective to modulate said mole ratio signal according to an efficiency of said catalyst with respect to a temperature of said catalyst.

6. A method for controlling a flow of ammonia into an exhaust of a fuel combustion apparatus to enable reaction of $NO_x$ in said exhaust with said ammonia in a catalyst for reduction of $NO_x$ effluent into the atmosphere, said apparatus being effective to produce a predicted $NO_x$ signal related to parameters in said combustion apparatus and at least one $NO_x$ setpoint signal representing a desired $NO_x$ condition downstream of said catalyst, a $NO_x$ analyzer producing a measured $NO_x$ signal related to a relative volume concentration of $NO_x$ downstream of said catalyst, comprising the steps of:

converting said measured $NO_x$ signal in terms of relative volume concentration into a $NO_x$ flow rate in terms of moles of $NO_x$ per unit time;

differencing the converted measured $NO_x$ flow rate and the $NO_x$ setpoint signal to produce a $NO_x$ error signal;

producing a mole ratio signal of ammonia to $NO_x$ in response to said $NO_x$ error signal;

multiplying said mole ratio signal by said predicted $NO_x$ signal to produce an ammonia command signal; and injecting said ammonia into said exhaust in response to said ammonia command signal.

* * * * *